United States Patent
Mitchell et al.

(10) Patent No.: US 9,673,863 B2
(45) Date of Patent: ***Jun. 6, 2017

(54) METHODS AND SYSTEM FOR INCREASING DATA TRANSMISSION RATES ACROSS A THREE-PHASE POWER SYSTEM

(71) Applicant: The Boeing Company, Chicago, IL (US)

(72) Inventors: Timothy M. Mitchell, Seattle, WA (US); Anil L. Kumar, Sammamish, WA (US); Bertin Koala, Seattle, WA (US); Brian E. Ward, Kent, WA (US); Nha T. Nguyen, Shoreline, WA (US); Roger C. vonDoenhoff, Federal Way, WA (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/162,067

(22) Filed: May 23, 2016

(65) Prior Publication Data
US 2016/0269078 A1 Sep. 15, 2016

Related U.S. Application Data

(63) Continuation of application No. 13/173,971, filed on Jun. 30, 2011, now Pat. No. 9,350,423.

(51) Int. Cl.
*H04B 3/54* (2006.01)

(52) U.S. Cl.
CPC ..... *H04B 3/542* (2013.01); *H04B 2203/5466* (2013.01)

(58) Field of Classification Search
None
See application file for complete search history.

(56) References Cited

U.S. PATENT DOCUMENTS 7,840,770 B2 11/2010 Larson et al.
7,893,557 B2 2/2011 Davis et al.
(Continued)

FOREIGN PATENT DOCUMENTS

CN 1309479 A 8/2001
CN 1839558 A 9/2006
(Continued)

OTHER PUBLICATIONS

International Search Report and Written Opinion for related application PCT/US2012/042542 dated Aug. 8, 2012; 10 pages.
(Continued)

*Primary Examiner* — Steve Young
(74) *Attorney, Agent, or Firm* — Armstrong Teasdale LLP (57) ABSTRACT

A method for providing information by optimizing the data rate to a vehicle over a three-phase power line utilized to provide power to the vehicle is described. The method includes assigning three separate frequency bands to three respective conductors extending between a ground power system and the vehicle, generating carrier signals in three separate frequency bands and modulating various data onto three carrier signals to generate three transmission signals for sending the various data from the ground power system to the vehicle at frequencies within respective ones of the three separate frequency bands. The frequencies for each of the three separate frequency bands do not overlap one another. The method also includes switching the three transmission signals onto respective conductors of the three-phase power line, demodulating the various data within the vehicle, and providing the various data to one or more vehicle systems.

20 Claims, 5 Drawing Sheets

(56) References Cited

U.S. PATENT DOCUMENTS

| | | | |
|---|---|---|---|
| 7,908,042 B2 | 3/2011 | Brinkley et al. | |
| 7,970,410 B2 | 6/2011 | Brinkley et al. | |
| 8,194,789 B2 * | 6/2012 | Wolter | H04B 3/54 375/136 |
| 8,335,062 B2 * | 12/2012 | Haines | H02H 3/00 320/109 |
| 2001/0038674 A1 | 11/2001 | Trans | |
| 2002/0141440 A1 | 10/2002 | Stanley et al. | |
| 2004/0061380 A1 | 4/2004 | Hann et al. | |
| 2004/0113757 A1 | 6/2004 | White et al. | |
| 2005/0017848 A1 * | 1/2005 | Flen | H04B 3/542 340/870.02 |
| 2005/0122999 A1 * | 6/2005 | Scherzer | H04L 1/02 370/480 |
| 2005/0194838 A1 | 9/2005 | Wetmore | |
| 2006/0049694 A1 * | 3/2006 | Kates | H02J 3/14 307/132 E |
| 2006/0114925 A1 | 6/2006 | Gerszberg et al. | |
| 2006/0187114 A1 * | 8/2006 | Gibson | G01S 7/285 342/195 |
| 2007/0001821 A1 * | 1/2007 | Berkman | H04B 3/542 330/250 |
| 2007/0115973 A1 | 5/2007 | Koga et al. | |
| 2008/0195259 A1 * | 8/2008 | Davis | H04B 3/548 701/1 |
| 2008/0225894 A1 * | 9/2008 | Powell | H04L 12/413 370/477 |
| 2008/0291850 A1 | 11/2008 | Jensen | |
| 2009/0134699 A1 | 5/2009 | Choi et al. | |
| 2010/0039242 A1 | 2/2010 | Refaeli et al. | |
| 2010/0109862 A1 | 5/2010 | Sharma | |
| 2011/0142110 A1 | 6/2011 | Schwager | |
| 2012/0027062 A1 * | 2/2012 | Garcia | H04B 3/544 375/224 |
| 2012/0028642 A1 * | 2/2012 | Schliwa-Bertling | C12N 5/0686 455/436 |
| 2012/0068784 A1 | 3/2012 | Varadarajan et al. | |
| 2012/0099627 A1 | 4/2012 | Mitchell et al. | |

FOREIGN PATENT DOCUMENTS

| | | |
|---|---|---|
| EP | 1956726 A1 | 8/2008 |
| EP | 2082962 A2 | 7/2009 |
| JP | 2004336770 A | 11/2004 |
| JP | 2008098812 | 4/2008 |
| WO | 9607245 | 3/1996 |
| WO | 9623368 | 8/1996 |
| WO | 2008097983 A1 | 8/2008 |

OTHER PUBLICATIONS

China Office Action for related application 201280032501.7 dated Nov. 2, 2015; 6 pp.

Notice of Reasons for Rejection for Japanese Patent Application No. 2014-518616, Jun. 21, 2016.

* cited by examiner

METHODS AND SYSTEM FOR INCREASING DATA TRANSMISSION RATES ACROSS A THREE-PHASE POWER SYSTEM

CROSS REFERENCE TO RELATED APPLICATIONS

This application is a continuation of U.S. patent application Ser. No. 13/173,971, filed Jun. 30, 2011 the disclosure of which is hereby incorporated herein by reference in their entirety which is hereby incorporated by reference in its entirety.

BACKGROUND

The field of the disclosure relates generally to methods and systems for data communication and more particularly, to methods and systems for increasing data transmission rates in communications across a three-phase power system.

Vehicles such as commercial aircraft, and the various systems thereon, generate and consume considerable amounts of data. For example, engines are monitored at every stage of operation, which results in generation of significant amounts of data. Such engine monitoring data includes, for example, but not limited to compression ratios, rotation rate (RPM), temperature, and vibration data. In addition, fuel related data, maintenance, Airplane Health Monitoring (AHM), operational information, catering data, In-flight Entertainment Equipment (IFE) updates and passenger data like duty free shopping are routinely and typically generated onboard the aircraft.

At least some of these systems wirelessly connect to a ground system through a central airplane server and central transceiver for data transmission and reception. However, certain systems are not configured for wireless transfer of data.

Therefore, when an aircraft arrives at a gate, much of the data is downloaded manually from the aircraft. Specifically, data recording devices are manually coupled to interfaces on the aircraft and the data is collected from the various data generators or log books for forwarding and processing at a back office. In addition, the back office function transmits updated datasets, for example data related to a next flight(s) of the aircraft, to the aircraft.

Demand for additional communication channels and data transfer is driving rapid change in connection with such communications. Such increased demand is due, for example, to increasing reliance by ground systems upon data from the aircraft, as well as increased communication needs of the flight crew, cabin crew, and passengers. In addition, data diversity along with an increasing number of applications producing and consuming data in support of a wide range of aircraft operational and business processes puts additional demand on communications.

The electrical energy used to power commercial airplanes on the ground is 115 Vac, 400 Hz, three-phase power, and includes a neutral line. It has been possible to transfer at least a portion of the data referred to above over these power lines. In one such system, a data transfer rate across a single phase (conductor) of the three-phase system up to about 65 Mbps has been accomplished. Transferring data on all three conductors of the three-phase system could triple the date rate. However, these "power stingers" used on flight lines around the world generally are fabricated using unshielded conductors. Attempting to transfer data over all three conductors, at a data rate considered to be useful for such application results in a noisy coupling between the conductors of the three-phase system. More specifically, the reduction in data rate caused by inductive and capacitive coupling of the signal and noise between the three phases on the 400 Hz ground power system results in an adverse effect on the data rate for a broadband over power line (BPL) communication system.

BRIEF DESCRIPTION

In one aspect, a method for providing information by optimizing the data rate to a vehicle over a single three-phase power line utilized to provide power to the vehicle is provided. The method includes assigning three separate frequency bands to three respective conductors extending between a ground power system and the vehicle. The three respective conductors form the three-phase power line. The method also includes generating carrier signals in three separate frequency bands and modulating various data onto three carrier signals to generate three transmission signals for sending the various data from the ground power system to the vehicle at frequencies within respective ones of the three separate frequency bands. The frequencies for each of the three separate frequency bands do not overlap one another. The method further includes switching the three transmission signals onto respective conductors of the three-phase power line, demodulating the various data within the vehicle, and providing the various data to one or more vehicle systems.

In another aspect, a data communication system is provided that includes a transmission medium comprising a single three-phase power line comprising a conductor associated with each respective phase and a controller. The controller operable to assign three separate frequency bands to three respective conductors extending between a ground power system and a vehicle. The three respective conductors form the three-phase power line. The controller also operable to generate multiple carrier frequencies in respective one of the three separate frequency bands, separate data for transmission across the transmission medium into a plurality of separate data packages, and modulate the plurality of separate data packages at frequencies within respective ones of the three separate frequency bands to send the plurality of separate data packages from the ground power system to the vehicle. The frequencies for each of the three separate frequency bands do not overlap one another.

In still another aspect, a system for transmission of broadband signals over a single three-phase power line is provided. The system includes a three-phase power system and a three-phase power line comprising a plurality of conductors, where the power line is operable for transfer of three-phase power generated by the three-phase power system to a load via the conductors. The system further includes a data source, a controller communicatively coupled to the data source and programmed to configure data received from the data source into data packages for transmission along the three-phase power line from a ground power system to a vehicle, and a modulation signal source. The controller may be further configured to associate a modulation frequency range with each conductor, a different modulation frequency range for each of the conductors such that the modulation frequency ranges do not overlap one another, and a modulation device (e.g., processing device) operable for modulating data packages from the controller onto one or more of the conductors using the modulation signal associated with the conductor to send the data packages from the ground power system to the vehicle. The controller is programmed to assign the data packages for modulation onto a specific one of the conductors based on a data rate associated with the three-phase power line.

The features, functions, and advantages that have been discussed can be achieved independently in various embodiments or may be combined in yet other embodiments, further details of which can be seen with reference to the following description and drawings.

DETAILED DESCRIPTION

The described embodiments are related to variable carrier frequency segregation between the three conductors of a broadband over power line system. Variable modulation frequency segregation overcomes the issues described herein with respect to cross coupling between the three conductors, and allows for filtering and signal separation for a tripling of the data rates as compared to current BPL systems.

More specifically, the described embodiments utilize frequency separation to improve signal to noise ratio in a wider range of frequency bands. Dynamic frequency selection on different phases is utilized along the different sections of the power distribution system to optimize the power rating that can be used without cross interference or interfering with other systems in physical proximity of the system.

Figure 1:
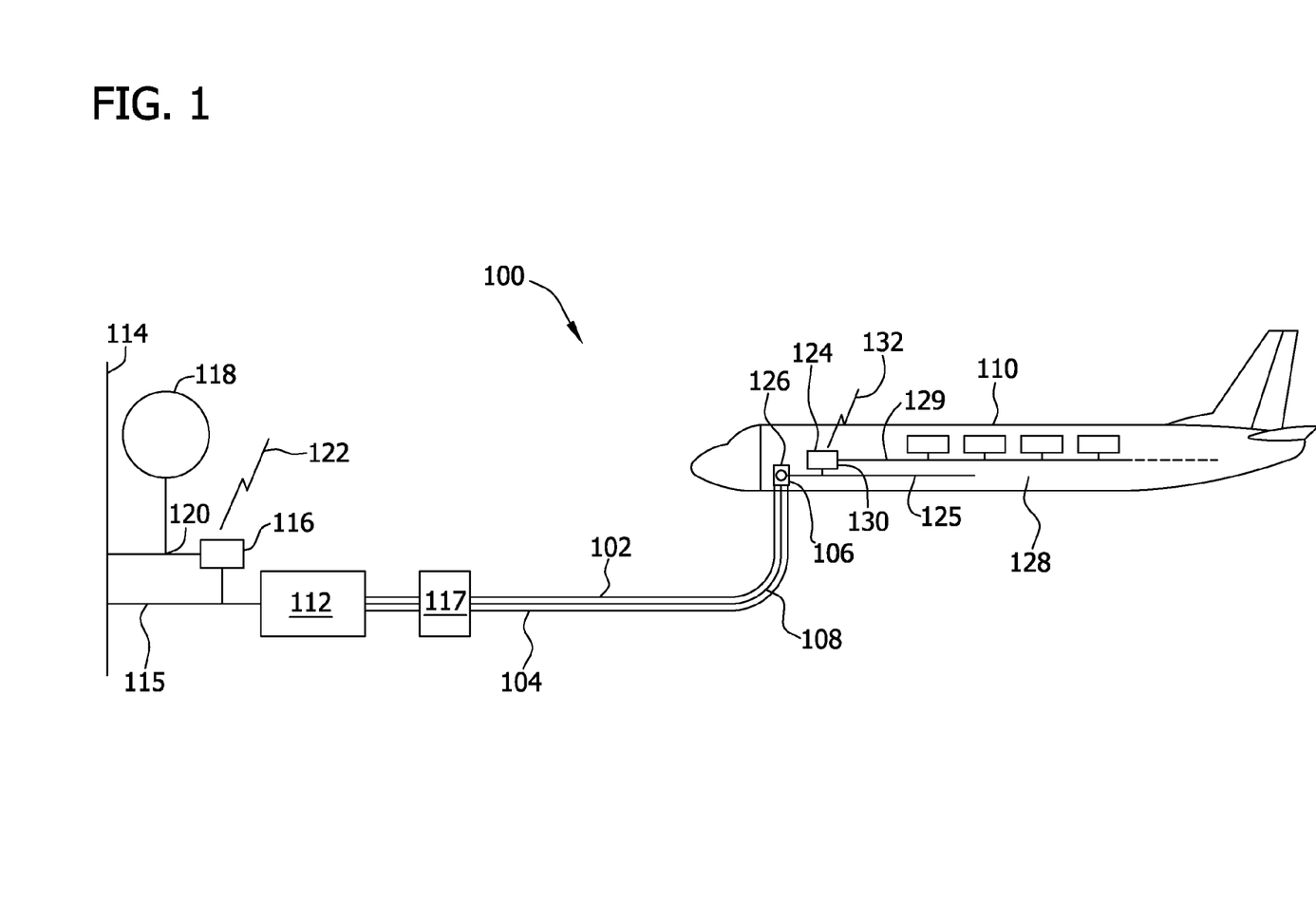
FIG. 1 is a block diagram of a power and digital communication transmission system.

FIG. 1 is a block diagram of a power and digital communication transmission system 100 in accordance with an exemplary embodiment of the disclosure. In the exemplary embodiment, power and digital communication transmission system 100 includes an electrical aircraft umbilical 102 comprising a supply end 104, a plug end 106, and an electrical conductor 108 extending there between. Plug end 106 is configured to mate with a vehicle such as an aircraft 110 such that electrical power is supplied to aircraft 110 through electrical conductor 108 from supply end 104. In the exemplary embodiment, supply end 104 couples to a ground power system 112 at an airport terminal gate 114. Ground power system 112 is configured to receive electrical power from a power supply through a power supply conduit 115. In other embodiments, ground power system 112 is located on a pier to couple to a boat, barge, or ship (not shown). In still other embodiments, ground power system 112 is positioned at a garage or service facility and is configured to couple to a wheeled vehicle, for example, but not limited to a car, a recreational vehicle (RV), or a train. Additionally, ground power system 112 may comprise another vehicle, such as a space vehicle, undersea or sea surface vehicle wherein one or both vehicles are moving with respect to each other and/or their surroundings while coupled through umbilical 102.

Power and digital communication transmission system 100 also includes a first interface device 116 electrically coupled to supply end 104. In the exemplary embodiment, interface device 116 is electrically coupled to supply end 104 through power supply conduit 115 and ground power system 112. In an alternative embodiment, interface device 116 is electrically coupled to supply end 104 downstream of ground power system 112. In one embodiment, ground power system 112 is a distributed power system operating at voltages that are incompatible with aircraft 110. In such embodiments, a point of use power system 117 is utilized to step the voltage to a level that is compatible with aircraft 110. In another alternative embodiment, interface device 116 is electrically coupled to electrical conductor 108 internal to ground power system 112. Interface device 116 is also coupled to a network 118 through a wired network access point 120 or a wireless communication link 122.

Power and digital communication transmission system 100 also includes a second interface device 124 electrically coupled to plug end 106 when umbilical 102 is coupled to aircraft 110. In the exemplary embodiment, interface device 124 is electrically coupled to an onboard power bus 125 through plug end 106 through an umbilical plug 126 penetrating a fuselage 128 of aircraft 110. Interface device 124 is also coupled to an onboard network 129 through an onboard wired network access point 130 or an onboard wireless communication link 132.

First interface device 116 is configured to transmit and receive data carrier signals though electrical conductor 108 while power is supplied to aircraft 110 through electrical conductor 108. First interface device 116 is also configured to convert the data carrier signals from and to a predetermined data format on the network. Second interface device 124 is electrically coupled to plug end 106 when umbilical 102 is coupled to aircraft 110. Second interface device 124 (e.g., a receiver and a transmitter, onboard transceiver) is configured to transmit and receive the data carrier signals between first interface device 116 and onboard network 129 while power is supplied to aircraft 110 through electrical conductor 108. In the exemplary embodiment, each of first interface device 116 and second interface device 124 are configured to detect a communication link established through the electrical conductor and report the link to system 100. Interface units 116 and 124 are electrically matched with the characteristics of umbilical 102 including but not limited to wire size, shielding, length, voltage, load, frequency, and grounding.

In the exemplary embodiment, the predetermined data format is compatible with various network protocols including but not limited to, Internet network protocol, gatelink network protocol, Aeronautical Telecommunications Network (ATN) protocol, and Aircraft Communication Addressing and Reporting System (ACARS) network protocol.

In the exemplary embodiment, high-speed network service to aircraft 110 while parked in a service location such as an airport terminal gate is provided through a conductor of the aircraft ground power umbilical using for example, but not limited to Broadband over Power Line (BPL), X10, or similar technology. Use of this technology permits the airports and airlines to add a simple interface to the aircraft umbilical at the gate and for aircraft manufacturers to provide a matching interface within the aircraft to permit broadband Internet service to the aircraft through an aircraft power link in the umbilical.

Broadband over Power Line (BPL) is a technology that allows Internet data to be transmitted over power lines. (BPL is also sometimes called Power-line Communications or PLC.) Modulated radio frequency signals that include digital signals from the Internet are injected/added/modulated onto the power line using, for example, inductive or capacitive coupling. These radio frequency signals are injected into the electrical power conductor at one or more specific points. The radio frequency signals travel along the electrical power conductor to a point of use. Little, if any, modification is necessary to the umbilical to permit transmission of BPL. The frequency separation in the umbilical substantially minimizes crosstalk and/or interference between the BPL signals and other wireless services. BPL permits higher speed and more reliable Internet and data network services to the aircraft than wireless methods. Using BPL also eliminates the need to couple an additional separate cable to aircraft 110 because it combines aircraft electrical power and Internet/data services over the same wire. System 100 uses for example, an approximately 2.0 MHz to approximately 80.0 MHz frequency or X10 similar ranges with the exact frequency range use defined and engineered by the characteristics and shielding of umbilical 102 and the allowable RFI/EMI levels in that particular environment.

In an embodiment, symmetrical hi-broadband BPL is used in umbilical 102 to transmit at communication speeds with aircraft 110 at rates in the tens or hundreds of megabits per second (Mbps). Because the BPL link is dedicated to only one aircraft 110 and not shared as wireless is, actual throughput can be from two to ten times the wireless throughput in the same environment. In addition, the throughput is stable and reliable in airport environments, whereas the existing wireless Gatelink services vary with the amount of RF interference and congestion at each airport.

However, and as described above, such systems are limited to a data transfer across a single phase (conductor) of the three-phase system due to, for example, crosstalk that occurs between the conductors of the tree-phase electrical conductor 108. More specifically, each of the three wires running together in electrical conductor 108, which is sometimes referred to as a three-phase stinger, is susceptible to RF energy from the other conductors running parallel to them. This cross noise results in a higher noise floor, results in a lower signal to noise ratio and therefore reduced data rates. This cross noise coupling results in an adverse effect on the data rate for a Broadband over Powerline Communication (BPL) system.

The following paragraphs describe the use of frequency separation to improve the signal to noise ratio in a wider range of frequency bands. Specifically, dynamic frequency selection is utilized on each conductor (e.g., each different phase of the three-phase system) and along the different sections of the power distribution system to optimize the power rating that can used without cross interference or interfering with other systems in physical proximity of the system.

Figure 2:
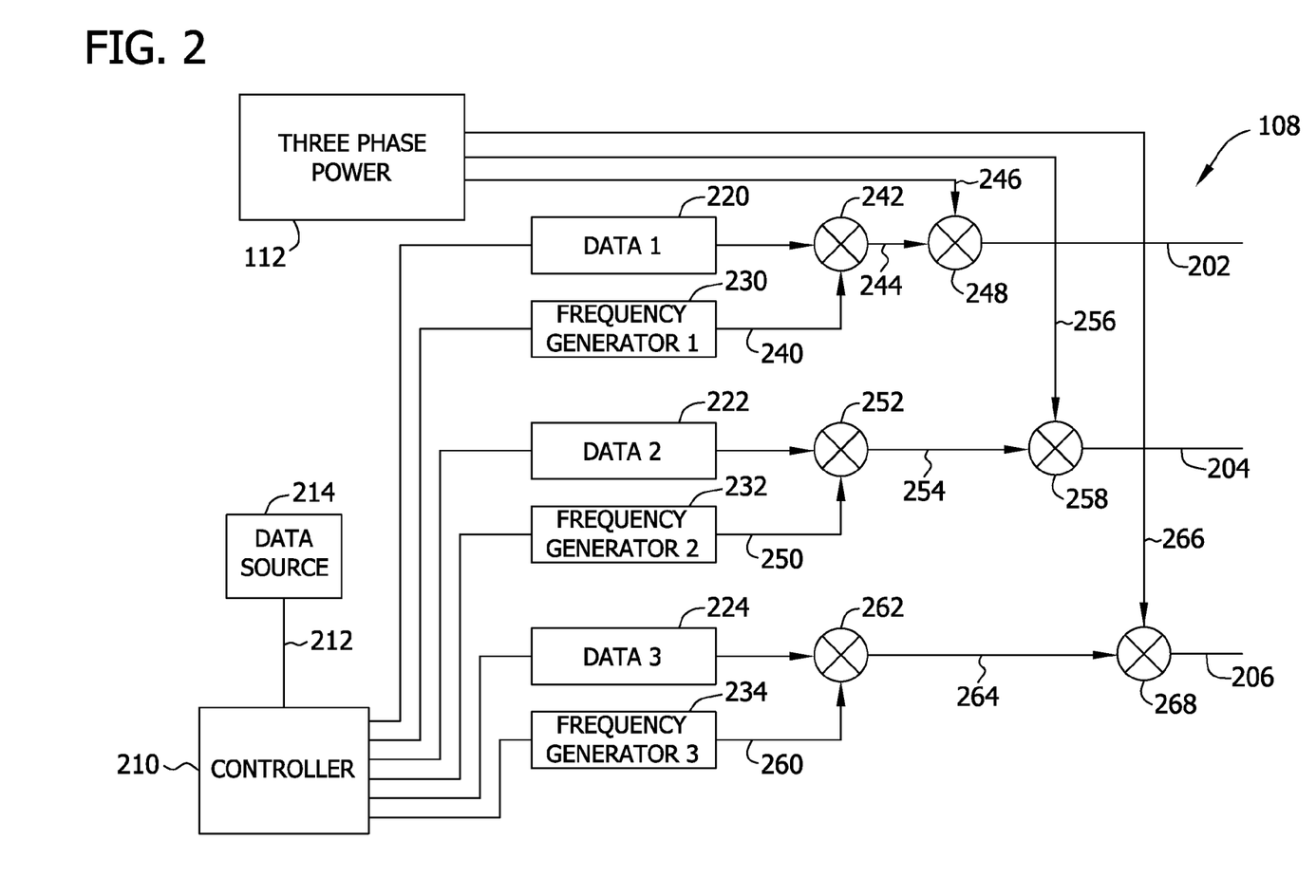
FIG. 2 is a block diagram illustrating dynamic frequency selection within a power and digital communication transmission system.

Specifically, FIG. 2 is a block diagram 200 illustrating dynamic frequency selection. The three conductors 202, 204, and 206 represent the three conductors of electrical conductor 108 described above as providing power and data to aircraft 110. A controller 210 receives data 212 from a data source 214 for transmission to aircraft 110 via conductors 202, 204, and 206. The controller is programmed to divide the data into three sets of data messages which are indicated as data 1 (220), data 2 (222) and data 3 (224). Three separate frequency generators 230, 232, and 234 are also controlled in operation by controller 210 and correspond to data 1 (220), data 2 (222) and data 3 (224). Data 1 220 is modulated with an output 240 of frequency generator 230 by modulator 242 to create a data transmission message. An output 244 of modulator 242 is then further modulated with one phase 246 of the three-phase power from ground power system 112 by modulator 248, to produce a first data transmission on power line signal 202 to be conducted to aircraft by electrical conductor 108.

Similarly, data 2 222 is modulated with an output 250 of frequency generator 232 by modulator 252 to create a data transmission message. An output 254 of modulator 252 is then further modulated with one phase 256 of the three-phase power from ground power system 112 by modulator 258, to produce a second data transmission on power line signal 204 to be conducted to aircraft by electrical conductor 108. Likewise, data 3 224 is modulated with an output 260 of frequency generator 234 by modulator 262 to create a data transmission message. An output 264 of modulator 262 is then further modulated with one phase 266 of the three-phase power from ground power system 112 by modulator 268, to produce a third data transmission on power line signal 206 to be conducted to aircraft by electrical conductor 108.

To overcome the problems described above, each of the frequency generators 230, 232, 234 operate over a different frequency spectrum. Further, controller 210 is programmed to determine a data rate associated with the three separate data transmission units and dynamically adjust the carrier frequencies generated by the three frequency generators 230, 232, 234 such that the conductors for all three phases of the three-phase power system are usable for data transmission with managed frequency segregation.

In the described embodiments, carrier frequencies that do not interfere with aircraft systems are utilized in the areas above ground near the aircraft 110. In this way, the described system embodiments are managed with a focus of being compatible in an airplane environment, to avoid disrupting avionics systems and communications. Carrier frequencies up to 80 MHz are utilized for BPL in the described embodiments, which are separated in frequency from critical airplane frequencies, and which allow for use of more energy and results in higher data rates. In a specific embodiment, frequency generator 230 is configured to provide a carrier frequency ranging between about 2 MHz to about 30 MHz (e.g. single signal, single data signal), frequency generator 232 is configured to provide a carrier frequency ranging between about 30 MHz to about 55 MHz, and frequency generator 234 is configured to provide a carrier frequency ranging between about 55 MHz to about 80 MHz which therefore provides the frequency separation described herein.

Those skilled in the art will understand that at aircraft 110, a similar configuration is provided for the separation of data and power from the separate conductors, and that the three separate data transmission packages may be combined for output to a single system on board the aircraft. Several scenarios are possible including using the three separate conductors (e.g., multiple conductors) and three data transmission packages (e.g., multiple data packages, multiple modulated data packages) to transmit data that is completely unrelated, with the data packages (e.g., specific data package) ultimately intended for receipt by three separate systems on board the aircraft 110.

In embodiments, the carrier frequencies on each of the phases are dynamically adjusted to accommodate any physical changes in the BPL system that might impact the characteristic of the conductor 108. As an example, measurements have shown that an airline mechanic, by simply putting his hand close (within 3 inches) to the conductor 108, can have a dramatic effect on the impedance characteristics and the frequency response of the conductor 108. Controller 210 provides a sense and control system that allows these changes to be managed and further optimized. To accomplish the above, the carrier frequencies can be controlled and changed in both the primary and secondary elements of the power distribution system. Further, controller 210 is programmed to monitor and track data trends across the three-phase conductors and provide predictive control changes based on one or more of use patterns, aircraft type, weather and electrical load.

Figure 3A:
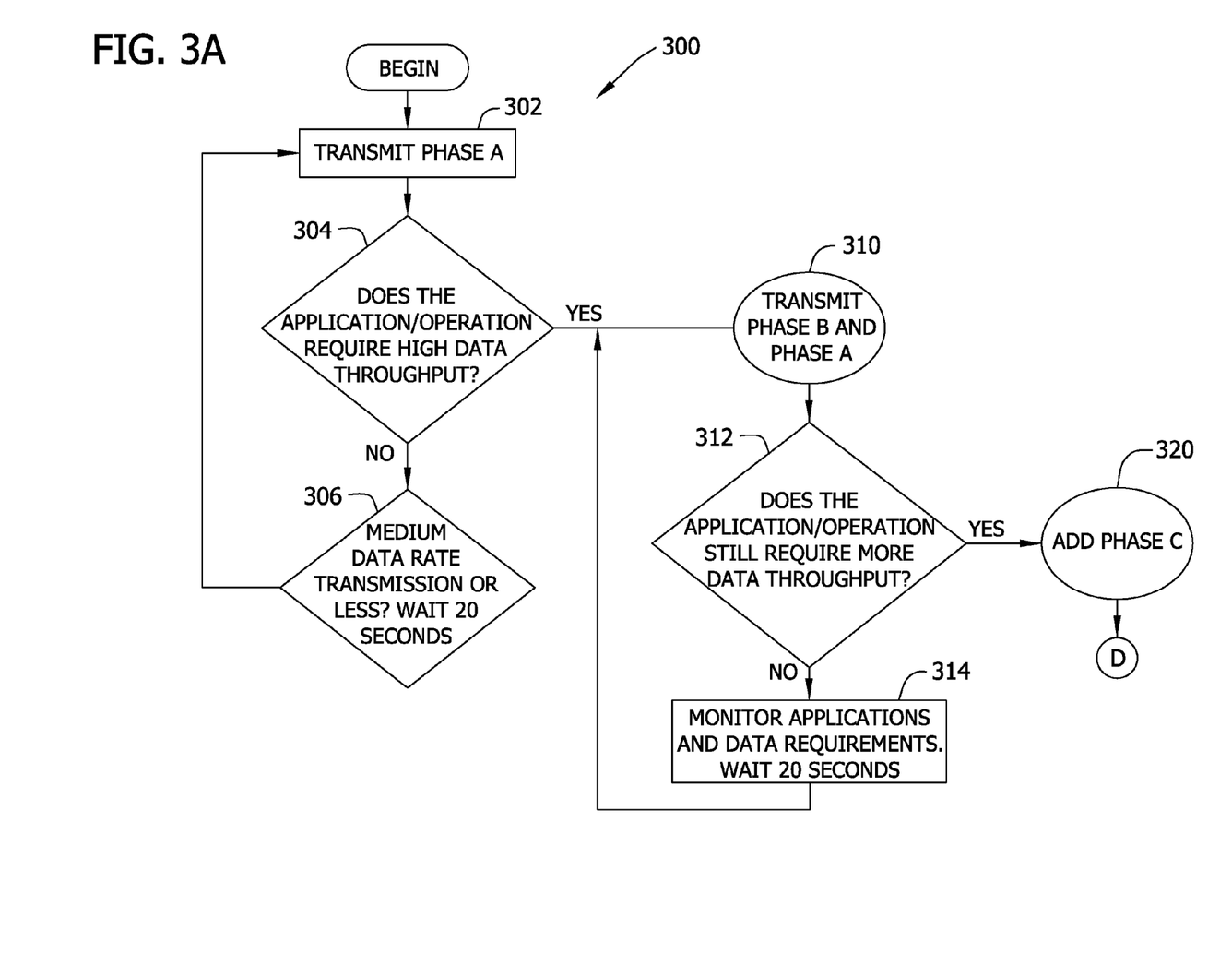
FIGS. 3A, 3B, and 3C are a flowchart illustrating a broadband over power line data transmission process.
Figure 3B:
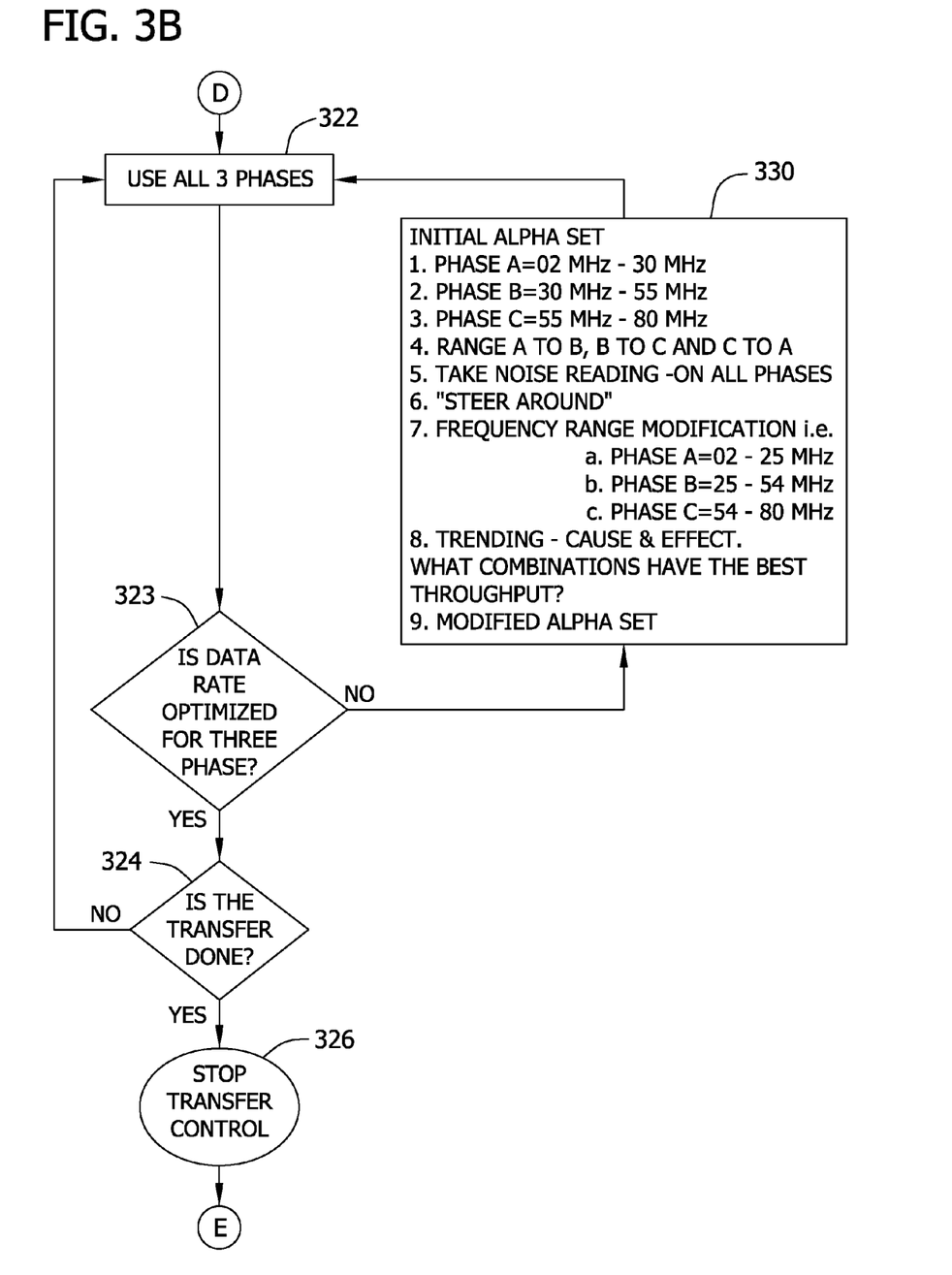
Figure 3C:
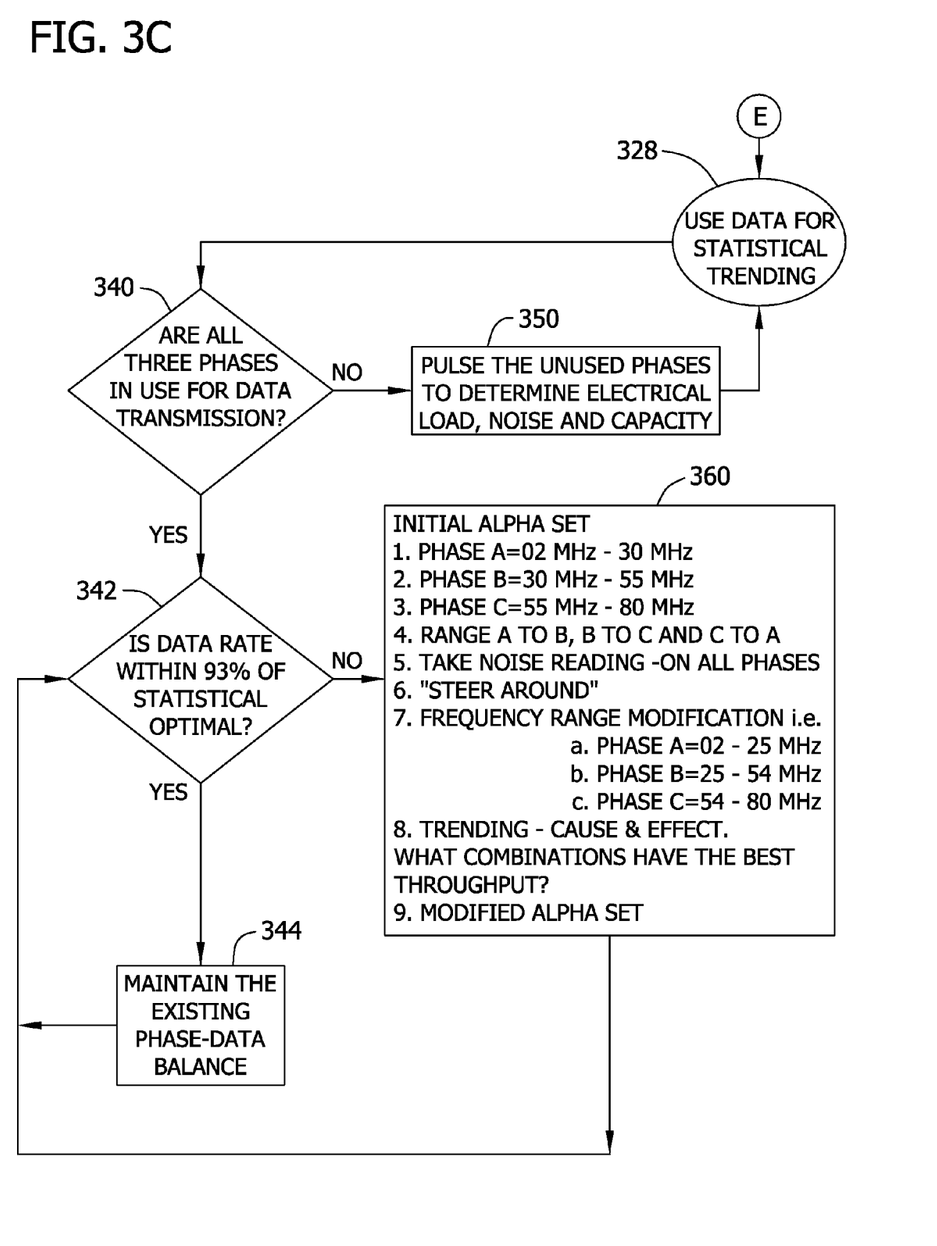

It is mentioned above that the data to be transmitted can be either originate from a single data source and be divided into three portions, or that the data originates from more than one data source and is subsequently routed to the separate conductors of the three-phase power line. FIGS. 3A, 3B, and 3C are a flowchart 300 that illustrates intelligent phase and frequency selection utilizing the above described embodiments. For example, and beginning with FIG. 3A, for a pending transmission 302 to be routed on phase A, it is determined 304 whether the transmission application/operation requires a high throughput. If the determination 304 is that the transmission application/operation does not require a high throughput, a time delay occurs 306, for example for 20 seconds (e.g., a predetermined period), to allow for any prior transmissions on the three conductors (e.g., multiple conductors) to be completed and the transmission 302 occurs on the phase A conductor (e.g., single conductor).

If the transmission application/operation requires a higher throughput, the phase B conductor is added 310 (e.g., additional conductor) to the transmission (e.g., now two conductors). If it is determined 312 that the transmission application/operation does not require still higher throughput, a time delay occurs 314, for example for 20 seconds, to allow for any prior transmissions on the three conductors to be completed and the transmission 310 occurs on the phase A and phase B conductors. If the transmission application/operation requires a still higher throughput, the phase C conductor is added 320 to the transmission. Moving to FIG. 3B, as the three conductors of the three-phase power line are being utilized 322 for transmission, the system repeatedly verifies 323 whether the data rate is optimized for the three phases and verifies 324 whether the transmission is completed. Once completed, transfer is stopped 326, and now moving to FIG. 3C, data related to the transfer is utilized 328 for statistical trending. If the transmission data rate was not within the optimal data rate, parameters are modified 330 from an alpha set of parameters With regard to trending, if all three conductors were used 340 for a transmission, the system determines 342 if the transmission data rate was at least, for example, 93% of an optimal data rate, the optimal data rate being selected by a user or determined from statistical results. The empirical data can be utilized in a variety of methods. For example, the historical performance can be averaged or used in a weighted running average or other advanced statistical method for trending optimization. If the transmission data rate was within the range of the optimal data rate (either mathematical, models or empirical, an existing phase-data balance is maintained 344).

If all three conductors were not used 340 for a transmission, the system applies 350 pulses to the unused conductors to determine one or more of an electrical load, noise and capacity, with the results being utilized 328 in the statistical trending. If the transmission data rate was not within the optimal data rate, parameters are modified 360 from an alpha set of parameters. For example and as described herein, the carrier frequencies associated with each conductor may be adjusted in an attempt to provide an increase to the data rate across the conductors. As would be applied to the example frequencies mentioned above, the carrier associated with phase A would be adjusted to a different frequency within the 2 MHz to 30 MHz band, the carrier associated with phase B would be adjusted to a different frequency within the 30 MHz to 55 MHz band, and the carrier associated with phase C would be adjusted to a different frequency within the 55 MHz to about 80 MHz band to determine which carrier frequency combinations, for example, provide the best throughput.

Although described with respect to an aircraft broadband power line application, embodiments of the disclosure are also applicable to other vehicles such as ships, barges, and boats moored at a dock or pier and also wheeled vehicles parked in a service area.

The above-described methods and systems for transmitting power and digital communication to provide high speed Internet service support directly to the aircraft while at the gate are cost-effective, secure and highly reliable. The methods and systems include integration and use of BPL or X10 similar technology into the aircraft and airport infrastructure to support broadband Internet and data services to the aircraft with minimal infrastructure impacts and cost. The integration of BPL, X10, or similar technology into the airport and aircraft permit using the existing aircraft gate umbilical to provide the aircraft with high-speed and high reliability Internet and data services from the airport gate. Accordingly, the methods and systems facilitate transmitting power and digital communication in a cost-effective and reliable manner.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for providing information by optimizing a data rate to a vehicle over a single three-phase power line utilized to provide power to the vehicle, said method comprising:

assigning respective non-overlapping frequency bands to three conductors extending between a ground power system and the vehicle, the three conductors forming the three-phase power line;

generating respective carrier signals having respective carrier frequencies in the respective non-overlapping frequency bands;

modulating data onto the respective carrier signals to generate three transmission signals for transmitting the data from the ground power system to the vehicle;

switching the three transmission signals onto the three conductors of the three-phase power line to transmit the data at a corresponding data rate for each of the three conductors;

adjusting at least one of the respective carrier frequencies to increase the corresponding data rate;

demodulating the data within the vehicle; and providing the data to one or more vehicle systems.

2. The method according to claim 1, wherein generating the respective carrier signals comprises:

generating a first carrier signal having a first carrier frequency within a first frequency range;

generating a second carrier signal having a second carrier frequency within a second frequency range; and generating a third carrier signal having a third carrier frequency within a third frequency range.

3. The method according to claim 1, wherein generating the respective carrier signals comprises:
generating a first carrier signal having a first carrier frequency between about 2 MHz and about 30 MHz;
generating a second carrier signal having a second carrier frequency between about 30 MHz and about 55 MHz; and
generating a third carrier signal having a third carrier frequency between about 55 MHz and about 80 MHz.

4. The method according to claim 1, wherein providing the data comprises:
providing a first set of data to a first system within the vehicle using a first conductor of the three conductors; and
providing a second set of data to a second system within the vehicle using a second conductor of the three conductors.

5. The method according to claim 4, wherein providing the data further comprises providing a third set of data to a third system in the vehicle using a third conductor of the three conductors.

6. The method according to claim 1, wherein providing the data comprises providing the data to a system by dividing the data into at least one of a first data set, a second data set, and a third data set, wherein in the first data set is provided using a first conductor of the three conductors, wherein the second data set is provided using a second conductor of the three conductors, and wherein the third data set is provided using a third conductor of the three conductors.

7. The method according to claim 1 further comprising adjusting the respective carrier frequencies based on one or more of use patterns, vehicle type, and weather.

8. The method according to claim 1 further comprising adjusting the respective carrier frequencies based on a current location of the vehicle.

9. The method according to claim 1 wherein generating the respective carrier signals comprises:
determining whether a transmission requires a throughput higher than can be achieved on a single conductor;
when the transmission does not require a higher throughput, delaying for a predetermined period, and subsequently commencing the transmission on the single conductor; and
when the transmission does require the higher throughput, adding at least one additional conductor of the three-phase power line to the transmission and subsequently commencing the transmission on multiple conductors.

10. The method according to claim 9 wherein subsequently commencing the transmission on the multiple conductors comprises:
determining whether the transmission requires a throughput higher than can be achieved on two conductors;
if, the transmission does not require a higher throughput, delaying for a predetermined period, and subsequently commencing the transmission on the two conductors; and
if, the transmission does require a higher throughput, adding an additional conductor of the three-phase power line to the transmission and subsequently commencing the transmission on the respective conductors.

11. A data communication system comprising:
a transmission medium extending between a ground power system and a vehicle, the transmission medium comprising a single three-phase power line comprising three conductors corresponding to respective phases;
a controller configured to:
assign respective non-overlapping frequency bands to the three conductors;
generate respective carrier signals having respective carrier frequencies in the respective non-overlapping frequency bands;
allocate data for transmission over the transmission medium to a plurality of data packages;
modulate the plurality of data packages onto the respective carrier signals for transmission of the plurality of data packages from the ground power system to the vehicle at a corresponding data rate for each of the three conductors; and
adjust at least one of the respective carrier frequencies to increase the corresponding data rate.

12. The system according to claim 11 further comprising:
a second electrical interface configured to decouple modulated data packages from the the three conductors after transmission to receive the plurality of data packages; and
a receiver configured to detect the plurality of data packages.

13. The system according to claim 12 further comprising a processing device configured to combine the plurality of data packages into a single signal.

14. The system according to claim 12 wherein the plurality of data packages are provided to respective systems within the vehicle based on a respective conductor each data package of the plurality of data packages was transmitted over.

15. The system according to claim 11, wherein said controller is further configured to:
generate a first carrier signal having a first carrier frequency within a first frequency range;
generate a second carrier signal having a second carrier frequency within a second frequency range; and
generate a third carrier signal having a third carrier frequency within a third frequency range.

16. The system according to claim 11, wherein said controller is further configured to adjust the respective carrier frequencies based on one or more of use patterns, vehicle type, and weather.

17. A system for transmission of broadband signals over a single three-phase power line, said system comprising:
a ground power system configured to generate three-phase power;
a three-phase power line comprising three conductors configured to deliver the three-phase power to an electrical load of a vehicle;
a frequency generator configured to generate respective carrier signals having respective carrier frequencies within respective non-overlapping frequency bands for the three conductors;
a data source configured to provide data;
a controller communicatively coupled to the data source and programmed to:
allocate the data from the data source into data packages for transmission over the three-phase power line from the ground power system to the vehicle;
assign the data packages to the three conductors based on corresponding data rates for the three conductors; and
adjust the carrier frequencies to increase the corresponding data rates; and a modulator configure to modulate the data packages from the controller onto at least one of the respective carrier signals for transmission over a corresponding one of the three conductors to transmit the data packages from the ground power system to the vehicle.

18. The system according to claim 17, wherein said controller is further programmed to:
   determine whether transmission of a specific data package requires a throughput higher than can be achieved on a single one of the three conductors;
   when the transmission does not require a higher throughput,
      delay the transmission for a predetermined period, and subsequently commence the transmission on the single one of the three conductors; and
   when the transmission does require the higher throughput,
      add at least one additional of the three conductors of the three-phase power line to the transmission, and subsequently commence the transmission by separating the data package into multiple data packages and modulating the separated data package onto the three conductors.

19. The system according to claim 17 further comprising a receiver operable to decouple modulated signals from the three conductors and combine the data packages into a single data signal.

20. The system accordingly to claim 17, wherein the controller is further programmed to divide the data into at least one of a first data set, a second data set, or a third data set, wherein in the first data set is to be transmitted using a first conductor of the three conductors, wherein the second data set is to be transmitted using a second conductor of the three conductors, and wherein the third data set is to be transmitted using a third conductor of the three conductors.

* * * * *

UNITED STATES PATENT AND TRADEMARK OFFICE
CERTIFICATE OF CORRECTION

PATENT NO. : 9,673,863 B2  
APPLICATION NO. : 15/162067  
DATED : June 6, 2017  
INVENTOR(S) : Mitchell et al.

It is certified that error appears in the above-identified patent and that said Letters Patent is hereby corrected as shown below:

In Column 11, Line 1, Claim 17, delete "a modulator configure to modulate" and insert --a modulator configured to modulate--.

Signed and Sealed this
Twenty-ninth Day of August, 2017

Joseph Matal
*Performing the Functions and Duties of the*
*Under Secretary of Commerce for Intellectual Property and*
*Director of the United States Patent and Trademark Office*